United States Patent [19]
Rocque

[11] Patent Number: 5,758,960
[45] Date of Patent: Jun. 2, 1998

[54] JOINT FOR LAMPS AND THE LIKE

[76] Inventor: Darren C. Rocque, P.O. Box 273521, Concord, Calif. 94527

[21] Appl. No.: 710,750

[22] Filed: Sep. 20, 1996

[51] Int. Cl.⁶ ............................................. F21S 1/12
[52] U.S. Cl. ........................... 362/410; 362/457; 248/440
[58] Field of Search ............................. 248/188.1, 440; 403/180, 217, 219; 312/257.1, 263, 265.4, 265.5; 362/352, 358, 360, 362, 367, 382, 410, 414, 415, 441, 457, 458

[56] References Cited

U.S. PATENT DOCUMENTS

| | | | |
|---|---|---|---|
| 1,863,767 | 6/1932 | Shapiro | 362/414 |
| 1,921,143 | 8/1933 | Wittliff | 248/440 |
| 3,689,762 | 9/1972 | Shatan | 362/352 |
| 3,864,049 | 2/1975 | Ono | 403/217 |
| 4,039,133 | 8/1977 | Streicher | 403/219 |
| 4,165,529 | 8/1979 | Hagelthorn | 362/352 |
| 4,747,031 | 5/1988 | Huang | 362/352 |
| 5,404,264 | 4/1995 | Park | 362/367 |

FOREIGN PATENT DOCUMENTS 614811   9/1926   France ................................ 362/352

*Primary Examiner*—Alan Cariaso
*Attorney, Agent, or Firm*—Douglas E. White; Acronational Law Firm

[57] ABSTRACT

A joint apparatus, or joint hiding and framing assembly, secures tubular members, such as legs, to panel members. The joint is used for forming items of furniture, such as lamps, tables, aquariums, and vases. The seams between the panel members and the tubular members are decoratively hidden by the joint hiding and framing assembly.

13 Claims, 3 Drawing Sheets

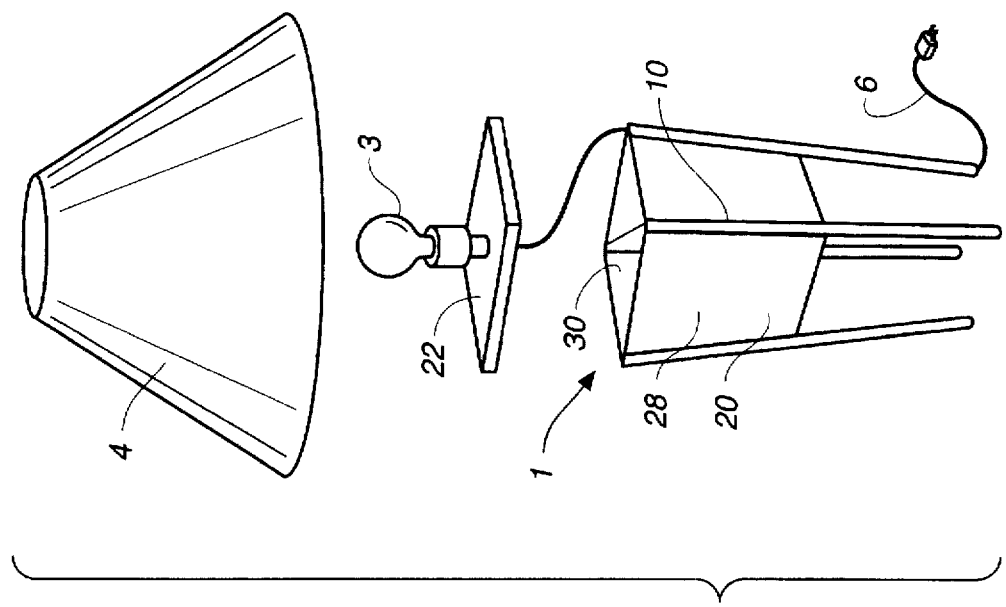
FIG._1A
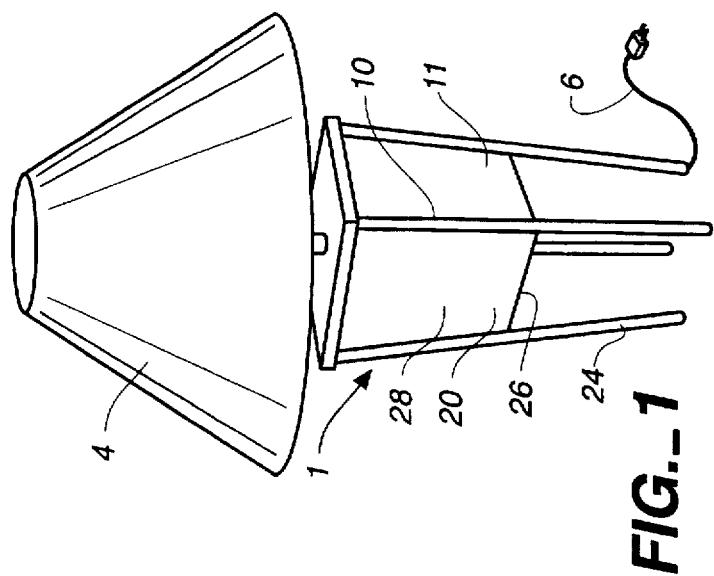
FIG._1

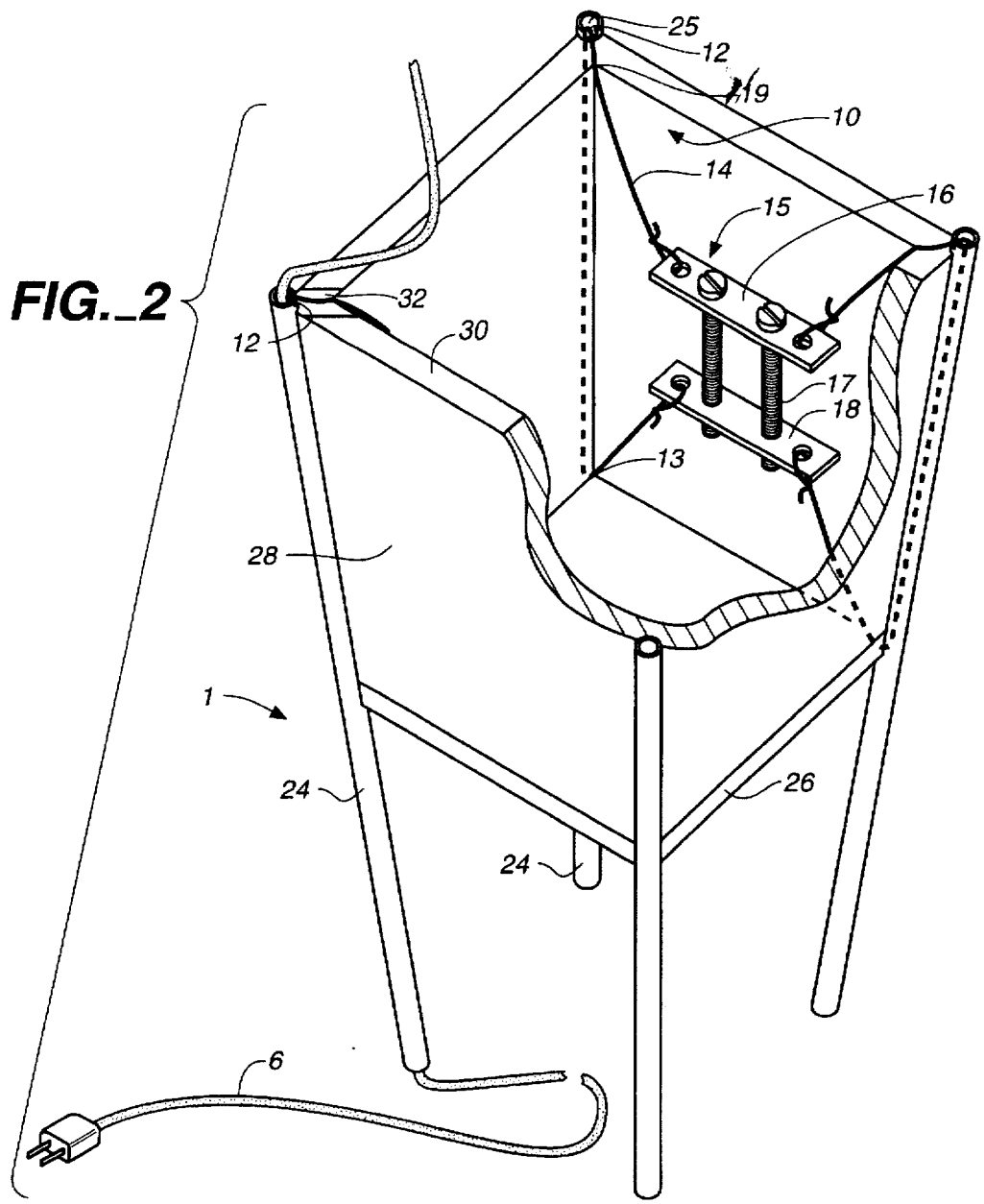
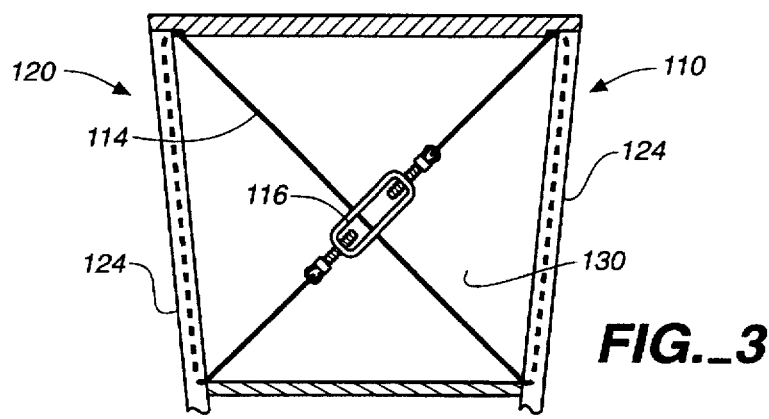

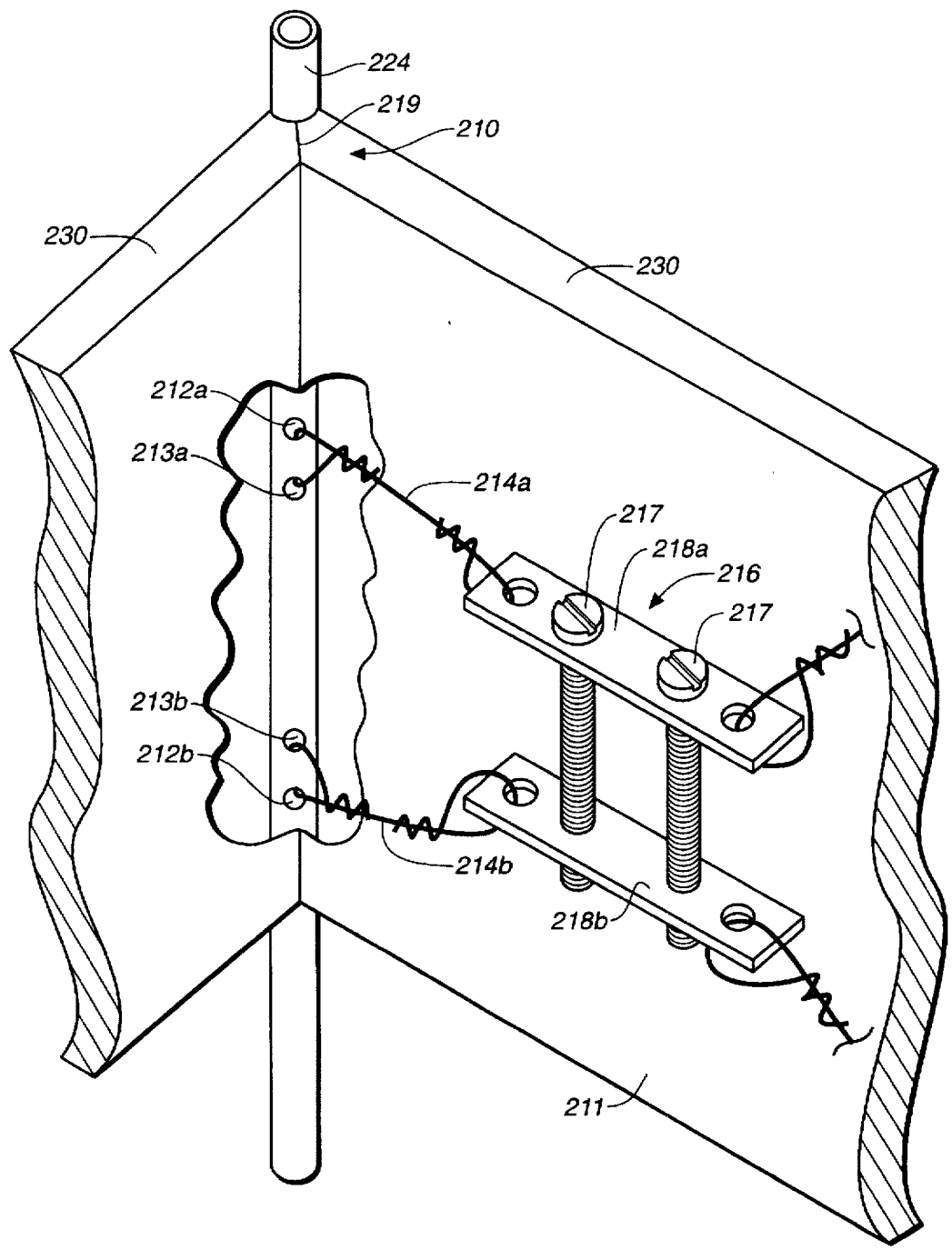
FIG._4

5,758,960

JOINT FOR LAMPS AND THE LIKE

FIELD OF THE INVENTION

This invention relates to furniture leg joints, more particularly to a wire harness joint for securing legs and the like to flat panels—preferably panels covered with thin sheet material.

BACKGROUND OF THE INVENTION

Heretofore, it has been difficult to design an attractive joint between a tubular leg (e.g., one of chrome metal, brushed aluminum or the like) and the adjacent side panels of tables and similar legged-furniture. For example, commonly a screw is driven through the leg into the seam area between two panels. This leaves an unsightly screw head in plain view on the leg. Other methods, such as welding inner posts for piercing the seam area, are expensive and may introduce their own unsightly blemishes and the like.

SUMMARY OF THE INVENTION

The present invention is a joint apparatus, or joint hiding and framing assembly, for securing tubular members, such as legs, to panel members with which to form items of furniture, such as lamps, tables, aquariums, and vases, wherein the seams between adjacent panel members are decoratively hidden.

The invention allows the panel members to be made from inexpensive materials, such as composite board, plywood, plastic, or the like, yet to be covered with, or laminated to, expensive decorative thin sheet materials, such as fabrics, leathers, plastic laminates (e.g., laminates sold under the brand name FORMICA), wood veneers, and sheet materials combined together in the form of collages.

Features and Advantages

An object of this invention is to disclose a joint, which joint may be incorporated into lamps, tables, aquariums, vases and similar furniture having three or more vertical leg supports. The joint of this invention includes the hollow tubular leg; a pair of panel members meeting at a seam; a wire running through the hollow core of the leg; and an adjustable clamp joining the ends of the wire together. The wire and clamp form a harness which pulls the leg against the seam.

Still another feature of the invention is that a bead of glue may be put down the joint and the wire harness then used as a clamping mechanism for the purpose of holding the legs in place while the glue sets.

A preferred feature is that the panel members may be covered with thin sheet material. The area where the sheet material meets the edge of the panel member is covered from view by the joint of this invention.

Another feature is that one clamp may be used to join together two or more wires, in order that two or more legs may be fastened at two or more joints and tightened down more or less simultaneously.

An additional feature of the joint is that a notch is formed at the top of each leg and an aperture is formed in the mid-section thereof, whereby the wire can exit the hollow core of the leg without detracting from the appearance of the joint and without interfering with the assembling of three or more side panels together with top and bottom cap panels to form an enclosed box.

A further feature is that while the legs may be vertical (in the normal fashion) alternatively they may taper inward decoratively.

Yet another feature is that the legs also can extend above the top cap, with the ability to suspend ornamentally therefrom a lamp shade. Alternatively, such upwardly extended legs can act as a pedestal upon which articles may be set or affixed—such as a flat panel to act as a table top.

In an alternate embodiment, a single wire may be used to secure two joints.

Yet another feature is a built-in lamp wherein the electrical cord thereof is decoratively hidden within the hollow core of one of the legs. This hidden cord feature may be used in other electrical furniture and frames, such as aquariums or lighted table tops.

Another feature is an apparatus that is easy to use, attractive in appearance and suitable for mass production at relatively low cost.

Other novel features which are characteristic of the invention, as to organization and method of operation, together with further objects and advantages thereof will be better understood from the following description considered in connection with the accompanying drawing, in which a preferred embodiment of the invention is illustrated by way of example. It is to be expressly understood, however, that the drawing is for illustration and description only and is not intended as a definition of the limits of the invention.

Certain terminology and derivations thereof may be used in the following description for convenience in reference only, and will not be limiting. For example, words such as "upwardly," "downwardly," "leftward," and "rightward" would refer to directions in the drawings to which reference is made unless otherwise stated. Similarly, words such as "inwardly" and "outwardly" would refer to directions toward and away from, respectively, the geometric center of a device or area and designated parts thereof. References in the singular tense include the plural, and vice versa, unless otherwise noted.

BRIEF DESCRIPTION OF THE DRAWING

FIG. 1 is a frontal perspective view of a preferred joint of this invention for a lamp and the like;

FIG. 1A is an exploded frontal perspective view of the joint and table lamp of FIG. 1;

FIG. 2 is a broken sectional rear perspective view of the joint and table lamp of FIG. 1, with the top cap removed;

FIG. 3 is a schematic broken sectional frontal elevation of a second embodiment of the invention; and FIG. 4 is a broken sectional perspective view of a third embodiment of the joint of this invention.

DRAWING REFERENCE NUMERALS 1 lamp
3 bulb
4 shade
6 cord
10 joint
11 base
12 notch
13 aperture
14 wire
15 harness
16 clamp
17 screw
18 plate 19 seam
20 table assembly
22 top cap
24 leg
25 hollow core
26 bottom cap
28 sheet material
30 side backing panel
32 groove
110 joint
114 wire
116 turnbuckle
120 table assembly
124 leg
210 joint
211 base
212a aperture
212b aperture
213a aperture
213b aperture
214a wire
214b wire
216 clamp
217 screw
218a plate
218b plate
219 seam
224 leg
230 side panel It is to be noted that, for convenience, the last two positions of the reference numerals of the alternate embodiments of the invention duplicate those of the numerals of the embodiment of FIG. 1, where reference is made to similar or corresponding parts. However, it should not be concluded merely from this numbering convention that similarly numbered parts are equivalents.

DESCRIPTION OF A PREFERRED EMBODIMENT

Referring to FIGS. 1 and 1A, there is illustrated therein a lamp 1 having a joint 10 of this invention. In general, the lamp 1 is comprised of a table assembly 20, a light bulb and socket 3, a shade 4, and an electrical cord 6. The table assembly 20 comprises a plurality of legs 24 (three or more—typically four), a plurality of joints 10 incorporating the legs 24, and, attached to the legs, a frame or base 11 comprised of an interconnected plurality of panel members.

The illustrated base 11 is comprised of four side backing panel members 30 covered with outwardly exposed decorative sheet material 28, a top cap 22, and a bottom cap 26. The top and bottom caps are affixed to the base by means other than the joints of this invention, e.g., by screws, glue or the like. This is because in the case of the top and bottom caps 22 and 26, there is no seam where tubular legs must be joined. Hence, more or less traditional methods may be used to join the caps to the side panels.

The joint 10 can be advantageously viewed with reference to FIG. 2. Joint 10 includes a tubular leg 24 having a hollow core 25; a pair of side backing panel members 30 meeting at a beveled seam 19; a wire 14 running through the hollow core 25 of the leg 24; and an adjustable clamp 16 joining the ends of the wire together. Each pair of panel members 30 preferably are held together at a seam 19 by suitable glue, nails, screws, or the like.

The top end of the wire 14 exits the top of the hollow 25 via a notch 12 in the upper edge of the leg 24, whereupon it enters the upper interior of the base 11. The bottom end of the wire exits the mid-section of the hollow core 25 via an aperture 13 in the midsection of the leg 24, whereupon it enters the lower interior of the base 11. The two ends of the wire 14 are secured to the upper and bottom plates 18 of the clamp 16. The wire 14 and clamp 16 together form a harness loop 15, which loop can be shortened by tightening the screws 17. This pulls the leg 24 securely in place against the seam 19.

The electrical cord 6 travels up the hollow core of another leg 24 and exits through a notch 12 in the upper edge of the leg (which notch is shared in common with the wire of a comparable harness affixed to that leg). That notch leads to an enlarged cord groove 32 in adjacent side backing panels 30. The cord 6 can pass unobstructed through the groove 32 into the interior of the base 11. The cord 6 enters the leg hollow via a comparable notch (not illustrated) at the bottom edge of the leg, which bottom notch allows the leg to rest flush against the floor.

A single clamp 16 may be used to tighten the wires 14 of two joints 10, as shown in FIG. 2. Alternatively, each wire and joint may have its own separate clamping means (not illustrated).

Two dual-loop harnesses 15 are needed in the embodiment of FIGS. 1 and 2 one adjacent to each of two mutually opposed side backing panels 30. Only the front dual harness is illustrated in the rear view of FIG. 2.

A second embodiment of this invention is illustrated in broken sectional elevation in FIG. 3. A pair of joints 110 includes a pair of tubular legs 124 having hollow cores; three side backing panel members 130 (only one of which is visible in FIG. 3) meeting at a pair of beveled seams; a single wire 114 running through the hollow cores of both legs 124 as illustrated; and a single turnbuckle 116 joining the ends of the wire together-the turnbuckle comprising clamping means for tightening a single dual-joint harness loop. Tightening the turnbuckle 116 pulls both legs 124 into tight engagement within the table assembly 120.

FIG. 4 illustrates yet a third embodiment of the leg joint of this invention. A joint 210 incorporates a hollow-core tubular leg 224, and, attached to the leg, a frame or base 211 comprised of an interconnected plurality of panel members 230.

The pair of side backing panel members 230 meet at a beveled seam 219. A pair of wires 214a, 214b run through the hollow core of the leg 224 and a screw-biased adjustable clamp 216 joins the ends of the wires together. The pair of panel members 230 preferably are held together at the seam 219 by suitable glue, nails, screws, or the like.

The top end of the upper wire 214a exits the top aperture 212a of a first aperture pair, whereupon it enters the upper interior of the base 211 and is attached to the top plate 218a of the clamp 216. The bottom end of the upper wire 214a exits the leg 224 via a bottom aperture 213a of the first aperture pair, whereupon it enters the lower interior of the base 211 and is wound around the wire 214a.

The bottom end of the bottom wire 214b exits the bottom aperture 212b of a second aperture pair, whereupon it enters the upper interior of the base 211 and is attached to the bottom plate 218b of the clamp 216. The upper end of the bottom wire 214b exits the leg 224 via an upper aperture 213b of the second aperture pair, whereupon it enters the lower interior of the base 211 and is wound around the wire 214b.

Wires 214a and 214b traverse the seam 219 via suitable notches, grooves, apertures or the like (not illustrated).

As noted, the two wires 214a, 214b are secured to the upper 218a and bottom 218b plates, respectively, of the clamp 216 (forming, in practice, angles more oblique to the plates than is apparent in the drawing). The wires 214a, 214b and the clamp 216 together form a wire harness of adjustable length, which harness can be shortened by tightening the screws 217. This pulls the leg 224 securely against the seam 219.

Note that in the embodiment illustrated in FIG. 4, both the top and the bottom ends of the leg 224 project out from the edges of the panels 230. The bottom end of the leg 224 is used to rest the apparatus on a table, floor, or the like—as in the previous embodiments. However, the top of the leg may project a considerable distance upward out of the base 211 (only a short projection being shown in FIG. 4) and used as a pedestal or shade holding apparatus. Such upward leg projections could be incorporated, as desired, into the embodiments of FIGS. 1–3, as well.

While the above provides a full and complete disclosure of the preferred embodiments of this invention, various modifications, alternative constructions, and equivalents may be employed without departing from the true spirit and scope of the invention. Such changes might involve alternative materials, components, structural arrangements, sizes, operational features or the like. For example, the light bulb, shade and cord of the first embodiment can be eliminated, allowing that device to function as a simple table. The tubular members can be cut off so as not to reach below the base of any particular embodiment, whereupon said tubular members will function not as legs, but as decorative edge moldings. Still another example is that a bead of glue may be put down the joint and the wire harness used as a clamping mechanism for the purpose of holding the legs in place while the glue sets.

Therefore, the above description and illustrations should not be construed as limiting the scope of the invention, which is defined by the appended claims.

What is claimed is:

1. Joint apparatus including:

at least one tubular leg, the leg having a hollow core;

at least a pair of panels fixedly joined together along at least one seam;

at least one wire having upper and lower ends;

at least one aperture in the leg, an end of the wire exiting the hollow core thereof through the aperture; and clamping means for tightening the wire so as to draw the leg against the pair of panels at the seam.

2. The apparatus of claim 1 wherein:

the clamping means is a pair of plates adjustably biased together by at least one screw.

3. The apparatus of claim 1 further including:

a notch in the leg above the aperture, through which said notch the upper end of the wire exits the hollow core, the lower end of the wire exiting through the aperture.

4. The apparatus of claim 1 wherein:

there are at least three tubular legs, and there are at least three panels fixedly joined together along at least three seams.

5. The apparatus of claim 4 further including:

a top cap affixed to the panels;

a bottom cap affixed to the panels; and an electrical cord traveling through the core of one leg and exiting a lower end thereof.

6. The apparatus of claim 5 further including:

an electric light bulb operatively connected to the electrical cord, and wherein the legs taper inwardly toward each other.

7. The apparatus of claim 6 wherein:

the seams fixedly hold adjacent panels together by glue, screws or nails, and the tops of the legs project upwardly above the tops of the panels.

8. The apparatus of claim 2 wherein:

there are two wires per leg, there are four apertures per leg, two apertures thereof forming an upper aperture pair and two apertures thereof forming a bottom aperture pair wherein within each leg, the upper and lower ends of a first wire exit the hollow core through the upper aperture pair thereof and the upper and lower ends of a second wire exit the hollow core through the bottom aperture pair thereof.

9. The apparatus of claim 2 further including:

thin sheet material covering each of the panels.

10. A joint hiding and framing assembly apparatus including:

a tubular leg, the leg having a hollow core;

a pair of panels fixedly joined together at a beveled seam; and a wire harness of adjustable length pulling the leg against the seam, the wire harness having at least one wire traveling through a portion of the hollow core.

11. The apparatus of claim 10 further including:

at least one aperture in the leg, an end of the wire exiting the hollow core thereof through the aperture; and a screw-biased clamp, the wire connected to the clamp.

12. The apparatus of claim 11 wherein:

there are two wires, each wire having two ends, and there are four apertures, each wire end exiting an aperture.

13. The apparatus of claim 11 further including:

thin sheet material covering each of the panels.

* * * * *